Ephraim Braley

Box for Chalk Lines

117375  PATENTED JUL 25 1871

Witness
John Williams
J. J. Ricker

Inventor
Ephraim Braley
Per W. F. Seavey Atty

UNITED STATES PATENT OFFICE.

EPHRAIM BRALEY, OF CARMEL, ASSIGNOR TO HIMSELF AND LUTHER C. HASTINGS, OF ELLSWORTH, MAINE.

IMPROVEMENT IN BOXES FOR CHALK-LINES.

Specification forming part of Letters Patent No. 117,375, dated July 25, 1871.

*To all whom it may concern:*

Be it known that I, EPHRAIM BRALEY, of Carmel, in the county of Penobscot and State of Maine, have invented a new and useful Box for Chalk-Lines; and I hereby declare the following to be a full, clear, and exact description of the same, which will enable others to make and use my invention, reference being had to the accompanying drawing forming a part of this specification, in which—

Figure 1:
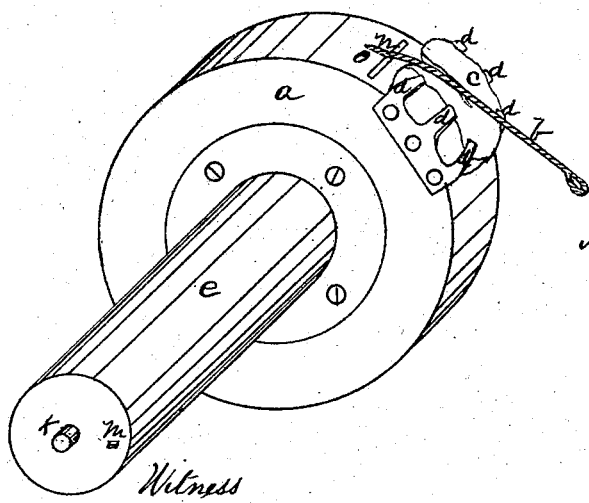
Figure 2:
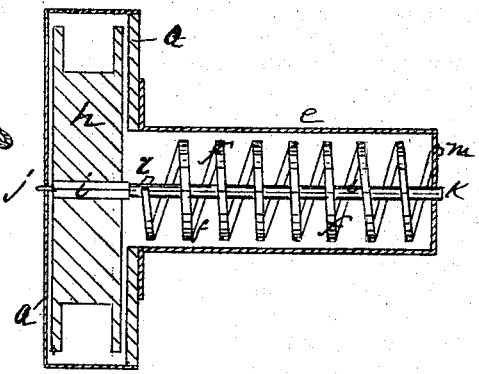

Figure 1 shows an isometrical view of the same. Fig. 2 shows a section and details.

Same letters show like parts.

Hitherto the chalk-line, ordinarily, has consisted of a cord or line rolled or coiled up and chalked by a piece of loose chalk when used. The line was apt to become snarled, or if exposed to rain to become wet and unserviceable.

The object of my invention is to provide a device more convenient than that now in use. I inclose the line in a covered box, winding in upon a reel therein, and so arranging it, by means of a spring, that it shall remain always coiled up when not in use. The line passes out through a narrow slot in the box which prevents its being tangled, and as it is drawn out passes over a piece of chalk so secured to the box as to be always in position for service. A check or stop may be placed upon the box near the slot, so as to hold the line at any point. This check may be of any convenient form.

By reference to the drawing I will more fully explain my invention. At $a$ is shown the box inclosing the line $b$. $c$ shows the chalk, held in its position by the fingers $d$, which may be either of some soft metal bent over the chalk to hold it, or held over it by properly-arranged springs. At $e$ is the handle containing the spring $f$, Fig. 2. $h$ shows the reel upon which the line is wound. This reel is hung upon the axle $i$, revolving on the points $j$ and $k$. To this axle, at $l$, is attached one end of the spring $f$, having its other extremity fastened to the handle $e$ at $m$ in such a way that, when the chalk-line $b$ is drawn off of the reel for use, the spiral spring $f$ is wound tightly around the axle, so as by its elasticity to rewind the line on the reel when it has been used. $n$ is the slot in the box, through which the line passes. A slight cut in the box $a$, as at $o$, will serve the purpose of a check to the line $b$ when enough has been drawn out for use, or this may be effected in any convenient way.

The advantages of my invention may be summed up in a few words: It is compact, simple, and durable. It protects the chalk-line from the weather, keeps it always free from snarls, does away with the trouble of winding it up after using, and the chalk is applied as the line is drawn out from the box without the necessity of using more than one hand. By means of the stop $o$ when a sufficient quantity of the line has been drawn out for use it may be held and pressed down to the timber to be chalked by simply turning over the box and catching the line between the edges of the slit $o$, when the line may be snapped by the other hand.

I do not claim a hinged box with a chalk-chamber, packing an inclosing spring, wheels, &c., devices set forth in the patent granted to J. E. Richardson, No. 88,212; neither do I claim a sponge and cases, chalk-receptacle, measuring-rule, &c., as is described in the patent of Solomon Beyl, granted December 22, 1868, and numbered 85,202; nor do I claim the combination described in the forfeited application of T. C. Hendry and P. W. Printup.

What I claim as my invention, and desire to secure by Letters Patent, is—

The arrangement of the chalk-clasps $d$, slot $n$ with its stop or check $o$, and box $a$ having the reel $h$ and coiled spring $f$ contained therein, all constructed as herein set forth, for the purposes specified.

EPHRAIM BRALEY.

Witnesses:
A. M. HASTINGS,
PHILIP GILES.